United States Patent
Winemiller et al.

(10) Patent No.: US 9,509,318 B2
(45) Date of Patent: Nov. 29, 2016

(54) APPARATUSES, METHODS, AND SYSTEMS FOR GLITCH-FREE CLOCK SWITCHING

(71) Applicant: QUALCOMM Incorporated, San Diego, CA (US)

(72) Inventors: Chad Everett Winemiller, Cary, NC (US); Behnam Amelifard, San Diego, CA (US); Kenneth Luis Arcudia, Cary, NC (US); Jon Raymond Boyette, Holly Springs, NC (US); Chia Heng Chang, San Diego, CA (US); Russell Coleman Deans, Chapel Hill, NC (US); Kevin Wayne Spears, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/657,225

(22) Filed: Mar. 13, 2015

(65) Prior Publication Data

US 2016/0269034 A1  Sep. 15, 2016

(51) Int. Cl.
*H03K 3/00* (2006.01)
*H03L 7/08* (2006.01)
*G06F 1/12* (2006.01)

(52) U.S. Cl.
CPC .............. *H03L 7/0802* (2013.01); *G06F 1/12* (2013.01)

(58) Field of Classification Search
USPC .............. 327/2–12, 105–123, 141, 144–163; 331/1 A, 15–17; 375/373–376
See application file for complete search history.

(56) References Cited

U.S. PATENT DOCUMENTS

| | | | |
|---|---|---|---|
| 6,307,424 B1* | 10/2001 | Lee .................... | H03K 19/0005 326/30 |
| 6,654,898 B1 | 11/2003 | Bailey et al. | |
| 7,038,506 B2 | 5/2006 | Om et al. | |
| 8,212,598 B2* | 7/2012 | Michiyoshi ........... | H03L 7/0891 327/147 |
| 8,412,967 B2 | 4/2013 | De Martini et al. | |

(Continued)

FOREIGN PATENT DOCUMENTS

| EP | 2573683 A1 | 3/2013 |
|---|---|---|
| JP | H036718 A | 1/1991 |

OTHER PUBLICATIONS

International Search Report and Written Opinion for PCT/US2016/016699, mailed May 4, 2016, 14 pages.

*Primary Examiner* — Brandon S Cole
(74) *Attorney, Agent, or Firm* — Withrow & Terranova, PLLC

(57) ABSTRACT

Aspects disclosed in the detailed description include apparatuses, methods, and systems for glitch-free clock switching. In this regard, in one aspect, an electronic circuit is switched from a lower-frequency reference clock to a higher-frequency reference clock. An oscillation detection logic is configured to determine the stability of the higher-frequency reference clock prior to switching the electronic circuit to the higher-frequency reference clock. The oscillation detection logic derives a sampled clock signal from the higher-frequency reference clock, wherein the sampled clock signal has a slower frequency than the lower-frequency reference clock. The oscillation detection logic then compares the sampled clock signal against the lower-frequency reference clock to determine the stability of the higher-frequency reference clock. By deterministically detecting stability of a reference clock prior to switching to the reference clock, it is possible to avoid premature switching to an unstable reference clock, thus providing glitch-free clock switching in the electronic circuit.

26 Claims, 8 Drawing Sheets

(56) References Cited

U.S. PATENT DOCUMENTS

| | | | |
|---|---|---|---|
| 8,570,014 B2 | 10/2013 | Laur et al. | |
| 8,670,014 B2 * | 3/2014 | Shoji | G03G 15/011 347/235 |
| 8,737,162 B2 * | 5/2014 | Ware | G11C 7/04 365/185.23 |
| 2002/0030521 A1 * | 3/2002 | Mizuno | H03K 19/00384 327/158 |
| 2005/0093593 A1 * | 5/2005 | Fukuzawa | H03K 3/0315 327/156 |
| 2006/0158268 A1 * | 7/2006 | McCorquodale | G06F 1/04 331/34 |
| 2007/0090864 A1 * | 4/2007 | Lee | H03L 7/0802 327/157 |
| 2008/0100363 A1 * | 5/2008 | Ramaraju | H03K 3/012 327/218 |
| 2008/0211561 A1 * | 9/2008 | Kurokawa | G06F 1/025 327/291 |
| 2008/0297202 A1 | 12/2008 | Takita et al. | |
| 2009/0085619 A1 * | 4/2009 | Westwick | H03K 17/223 327/143 |
| 2012/0169310 A1 * | 7/2012 | Dearborn | H02M 3/1588 323/271 |
| 2014/0084965 A1 * | 3/2014 | Ahn | H03K 17/30 327/109 |

\* cited by examiner

APPARATUSES, METHODS, AND SYSTEMS FOR GLITCH-FREE CLOCK SWITCHING

BACKGROUND

I. Field of the Disclosure

The technology of the disclosure relates generally to low-power operations to reduce power consumption in electronic systems.

II. Background

Mobile communication devices have become increasingly common in current society. The prevalence of these mobile communication devices is driven in part by the many functions that are now enabled on such devices. Demand for such functions increases the processing capability requirements for the mobile communication devices. As a result, the mobile communication devices have evolved from being purely communication tools into sophisticated mobile entertainment centers.

Concurrent with the rise in the processing capability of the mobile communication devices is the increase in power consumption by the mobile communication devices. Low-power operations are commonly employed by the mobile communication devices to conserve power and prolong battery life. During the low-power operations, the mobile communication devices can opportunistically switch off electronic circuits that are idle or underutilized. For example, an input/output (I/O) circuit may be switched off when there is no data to transmit and switched back on when data becomes available for transmission. With more and more multi-frequency reference clocks being used to control the electronic circuits, the reference clocks associated with the electronic circuits are often switched off or configured to operate at a reduced frequency when the electronic circuits are placed in low-power operations.

When the electronic circuit exits the low-power operations, the electronic circuit will not become operational until the associated reference clocks fully ramp up and stabilize. As a result, the electronic circuit may be forced to exit the low-power operations earlier than needed to accommodate for the reference clock ramp-up and stabilization delays. Such early exit reduces the effectiveness of the low-power operations. Furthermore, premature switching to the associated reference clock (i.e., before the associated reference clock is stable) may result in metastability in the electronic circuit.

SUMMARY OF THE DISCLOSURE

Aspects disclosed in the detailed description include apparatuses, methods, and systems for glitch-free clock switching. In this regard, in one aspect, an electronic circuit is switched from a lower-frequency reference clock to a higher-frequency reference clock. An oscillation detection logic is configured to determine the stability of the higher-frequency reference clock prior to switching the electronic circuit to the higher-frequency reference clock. The oscillation detection logic derives a sampled clock signal from the higher-frequency reference clock, wherein the sampled clock signal has a slower frequency than the lower-frequency reference clock. The oscillation detection logic then compares the sampled clock signal against the lower-frequency reference clock to determine the stability of the higher-frequency reference clock. By deterministically detecting stability of a reference clock prior to switching to the reference clock, it is possible to avoid premature switching to an unstable reference clock, thus providing glitch-free clock switching in the electronic circuit and improving robustness of the electronic circuit.

In this regard, in one aspect, a clock switching control circuit is provided. The clock switching control circuit comprises a power control logic configured to switch an electronic circuit from a first reference clock signal associated with a first operation mode to a second reference clock signal associated with a second operation mode. The clock switching control circuit also comprises an oscillation detection logic coupled to the power control logic. The oscillation detection logic is configured to determine stability of the second reference clock signal based on the first reference clock signal. The oscillation detection logic is also configured to provide a clock stability indication to the power control logic if the second reference clock signal is determined stable. The power control logic is configured to control the electronic circuit to switch from the first reference clock signal to the second reference clock signal in response to receiving the clock stability indication.

In another aspect, a clock switching control circuit is provided. The clock switching control circuit comprises a means for controlling a power mode configured to switch an electronic circuit from a first reference clock signal associated with a first operation mode to a second reference clock signal associated with a second operation mode. The clock switching control circuit also comprises a means for detecting a clock stability coupled to the means for controlling the power mode. The means for detecting the clock stability is configured to determine stability of the second reference clock signal based on the first reference clock signal. The means for detecting the clock stability is also configured to provide a clock stability indication to the means for controlling the power mode if the second reference clock signal is determined stable. The means for controlling the power mode is configured to control the electronic circuit to switch from the first reference clock signal to the second reference clock signal in response to receiving the clock stability indication.

In another aspect, a method for switching reference clocks in an electronic circuit is provided. The method comprises switching from a lower-frequency reference clock to a higher-frequency reference clock. The method of switching from the lower-frequency reference clock to the higher-frequency reference clock comprises determining stability of the higher-frequency reference clock based on the lower-frequency reference clock prior to switching to the higher-frequency reference clock. The method of switching from the lower-frequency reference clock to the higher-frequency reference clock also comprises switching from the lower-frequency reference clock to the higher-frequency reference clock if the higher-frequency reference clock is determined stable.

In another aspect, an oscillation detection logic is provided. The oscillation detection logic comprises a ripple divider configured to generate a plurality of divided clock signals based on a clock input signal. The oscillation detection logic also comprises a sampling logic coupled to the ripple divider. The sampling logic is configured to select programmably a sampled clock signal among the plurality of divided clock signals. The sampling logic is also configured to output one or more edge detect indications relative to a clock cycle of a benchmark clock signal. The oscillation detection logic also comprises a sampling comparison logic coupled to the sampling logic to receive the one or more edge detect indications, wherein the sampling comparison logic is configured to count the one or more edge detect indications received during the clock cycle of the benchmark clock signal to detect a frequency match between the sampled clock signal and the benchmark clock signal. The oscillation detection logic also comprises a sampling decision logic coupled to the sampling comparison logic. The sampling decision logic is configured to determine stability of the clock input signal based on a predetermined clock stability threshold. The sampling decision logic is also configured to generate a clock stability indication if the clock input signal is determined stable.

DETAILED DESCRIPTION

Figure 1:
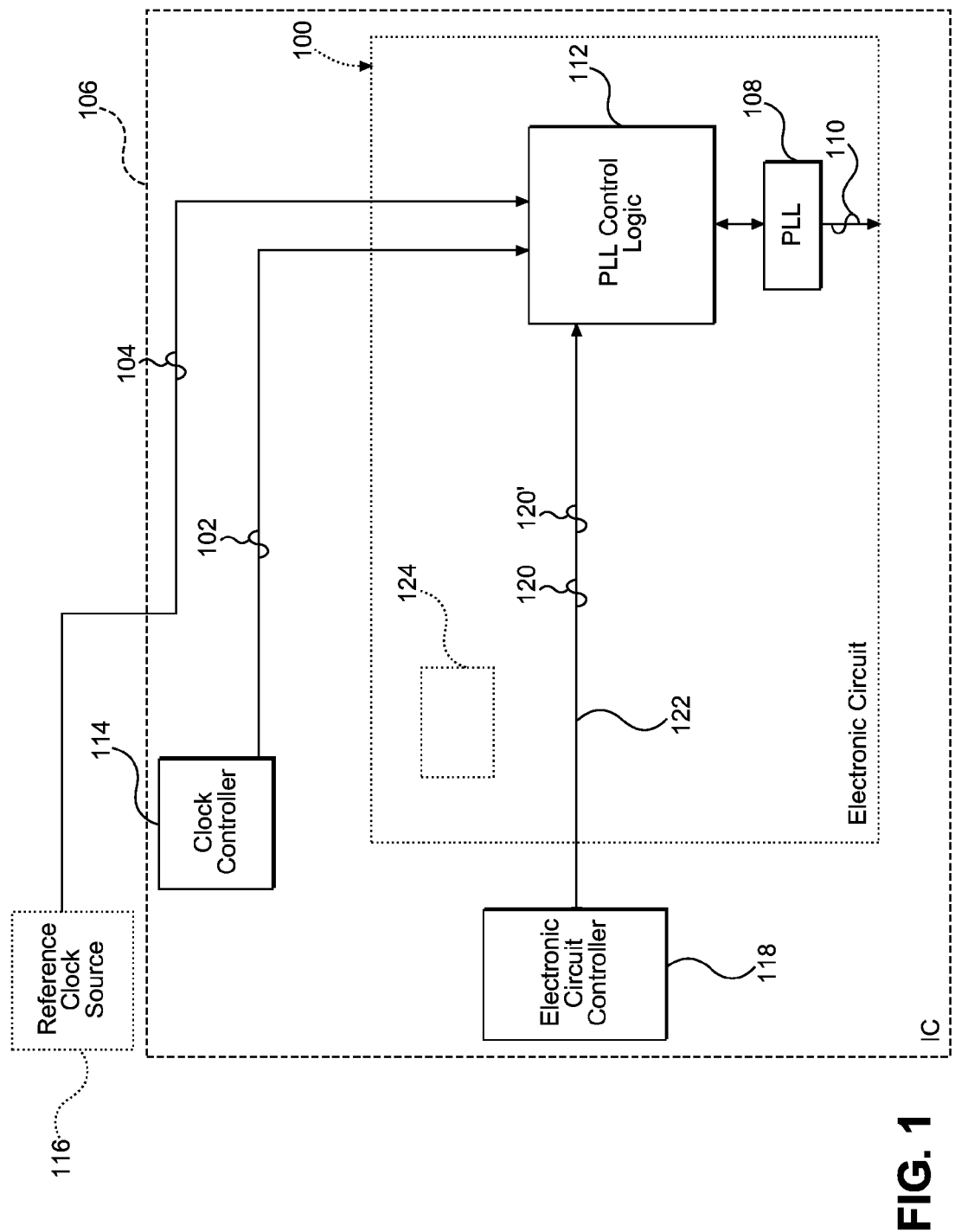
FIG. 1 is a schematic diagram of an exemplary electronic circuit configured to switch from a first reference clock signal (lower-frequency reference clock) to a second reference clock signal (higher-frequency reference clock) based on a conventional clock-switching approach.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include apparatuses, methods, and systems for glitch-free clock switching. In this regard, in one aspect, an electronic circuit is switched from a lower-frequency reference clock to a higher-frequency reference clock. An oscillation detection logic is configured to determine the stability of the higher-frequency reference clock prior to switching the electronic circuit to the higher-frequency reference clock. The oscillation detection logic derives a sampled clock signal from the higher-frequency reference clock, wherein the sampled clock signal has a slower frequency than the lower-frequency reference clock. The oscillation detection logic then compares the sampled clock signal against the lower-frequency reference clock to determine the stability of the higher-frequency reference clock. By deterministically detecting stability of a reference clock prior to switching to the reference clock, it is possible to avoid premature switching to an unstable reference clock, thus providing glitch-free clock switching in the electronic circuit and improving robustness of the electronic circuit.

Before discussing aspects of glitch-free clock switching that include specific aspects of the present disclosure, a brief overview of a conventional approach for switching clocks in an electronic circuit that may benefit from exemplary aspects of the present disclosure is provided with reference to FIG. 1. The discussion of specific exemplary aspects of glitch-free clock switching starts below with reference to FIG. 2A.

In this regard, FIG. 1 is a schematic diagram of an exemplary electronic circuit 100 configured to switch from a first reference clock signal 102 to a second reference clock signal 104 based on a conventional clock-switching approach. The first reference clock signal 102 and the second reference clock signal 104 are hereinafter referred to as a lower-frequency reference clock 102 and a higher-frequency reference clock 104, respectively. In this regard, the higher-frequency reference clock 104 has a higher frequency than the lower-frequency reference clock 102. In a non-limiting example, the lower-frequency reference clock 102 may be an auxiliary reference clock and the higher-frequency reference clock 104 may be a system reference clock.

With continuing reference to FIG. 1, in a non-limiting example, the electronic circuit 100 is disposed in an integrated circuit (IC) 106. The electronic circuit 100 comprises a phase-locked loop (PLL) 108. The PLL 108 is a closed-loop frequency control system configured to generate a stable high-frequency reference signal 110 based on an input reference signal such as the higher-frequency reference clock 104. To function properly, the PLL 108 must maintain a constant phase angle relative to the higher-frequency reference clock 104. In other words, the PLL 108 will not function properly until the PLL 108 is phase-locked with the higher-frequency reference clock 104. The PLL 108 is controlled by a PLL control logic 112. In a non-limiting example, the PLL control logic 112 and the PLL 108 may be integrated into an IC.

With continuing reference to FIG. 1, a clock controller 114, which may be provided inside or outside the electronic circuit 100, provides the lower-frequency reference clock 102. A reference clock source 116, which may also be provided inside or outside the IC 106, provides the higher-frequency reference clock 104. In a non-limiting example, the lower-frequency reference clock 102 is associated with a low-power operation mode of the electronic circuit 100, wherein some or all parts of the electronic circuit 100 are switched off to conserve power. In another non-limiting example, the higher-frequency reference clock 104 is associated with a normal-power operation mode of the electronic circuit 100, wherein all parts of the electronic circuit 100 are functional. An electronic circuit controller 118 is configured to control the electronic circuit 100 to switch between the low-power operation mode and the normal-power operation mode. Accordingly, the electronic circuit controller 118 also causes the electronic circuit 100 to switch between the lower-frequency reference clock 102 and the higher-frequency reference clock 104.

With continuing reference to FIG. 1, to switch the electronic circuit 100 from the low-power operation mode to the normal-power operation mode, the electronic circuit controller 118 provides a first power mode signal 120 to the PLL control logic 112 to switch the electronic circuit 100 from the lower-frequency reference clock 102 to the higher-frequency reference clock 104. In contrast, to switch the electronic circuit 100 from the normal-power operation mode to the low-power operation mode, the electronic circuit controller 118 provides a second power mode signal 120' to the PLL control logic 112 to switch the electronic circuit 100 from the higher-frequency reference clock 104 to the lower-frequency reference clock 102. In a non-limiting example, the first power mode signal 120 may be provided by asserting a logical high on a power mode signal line 122 and the second power mode signal 120' may be provided by asserting a logical low on the power mode signal line 122.

With continuing reference to FIG. 1, while the electronic circuit 100 is operating in the low-power operation mode based on the lower-frequency reference clock 102, the higher-frequency reference clock 104 is placed in a standby mode or subactive mode. When the electronic circuit 100 is switched from the lower-frequency reference clock 102 to the higher-frequency reference clock 104, the higher-frequency reference clock 104 transitions from the standby mode or the subactive mode to an active mode. The transition involves restarting and stabilizing oscillation of the higher-frequency reference clock 104. In this regard, the PLL 108 cannot phase lock with the higher-frequency reference clock 104 until the higher-frequency reference clock 104 becomes stable. As a result, the electronic circuit 100 must wait for the higher-frequency reference clock 104 to stabilize before being functional. However, the electronic circuit 100 has no knowledge regarding the exact timing at which the higher-frequency reference clock 104 becomes stable because the reference clock source 116 may be located outside the IC 106. According to the conventional clock-switching approach, the electronic circuit 100 employs an oscillation detection timeout timer 124 to estimate a stabilization timing of the higher-frequency reference clock 104. Understandably, this approach has many potential drawbacks. If the oscillation detection timeout timer 124 is set too short, it is possible that the electronic circuit 100 switches prematurely to the higher-frequency reference clock 104 while the higher-frequency reference clock 104 is unstable. In contrast, if the oscillation detection timeout timer 124 is set too long, the electronic circuit 100 may incur undue delay in entering the normal-power operation mode. Hence, it is desirable for the electronic circuit 100 to detect deterministically the stability of the higher-frequency reference clock 104 to ensure glitch-free and timely switching to the higher-frequency reference clock 104.

Figure 2A:
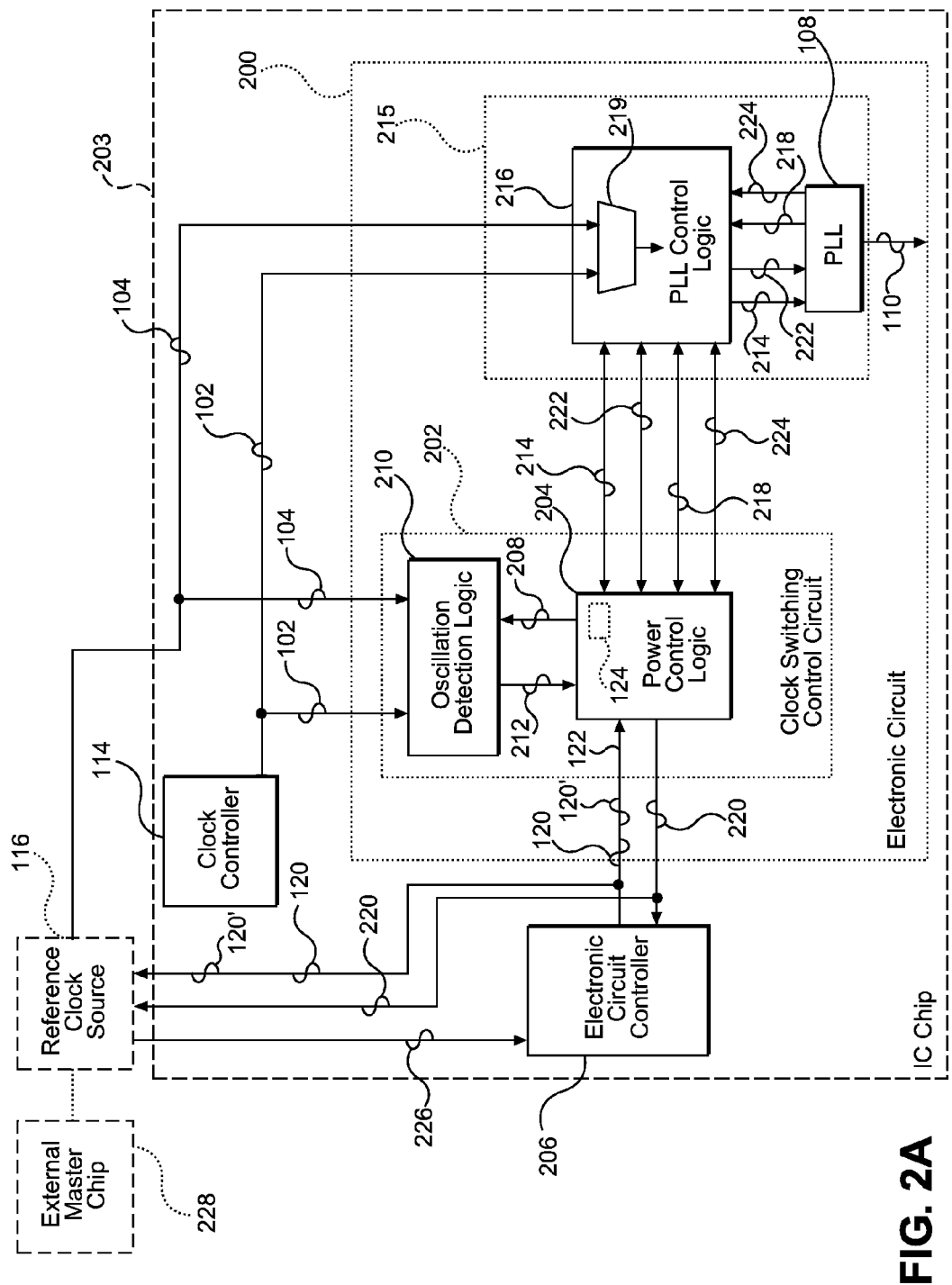
FIG. 2A is a schematic diagram of an exemplary electronic circuit configured to detect deterministically the stability of a higher-frequency reference clock based on the lower-frequency reference clock prior to switching from the lower-frequency reference clock to the higher-frequency reference clock with the higher-frequency reference clock positioned outside the integrated circuit that includes the electronic circuit.

In this regard, FIG. 2A is a schematic diagram of an exemplary electronic circuit 200 configured to detect deterministically the stability of the higher-frequency reference clock 104 based on the lower-frequency reference clock 102 prior to switching from the lower-frequency reference clock 102 to the higher-frequency reference clock 104. Elements of FIG. 1 are referenced in connection with FIG. 2 and will not be re-described herein.

With continuing reference to FIG. 2A, a clock switching control circuit 202 is provided in the electronic circuit 200 that is disposed in an IC chip 203. In a non-limiting example, the clock switching control circuit 202 is provided in a physical coding sublayer (PCS) (not shown) of the electronic circuit 200. In another non-limiting example, the electronic circuit 200 may be a peripheral component interconnect express (PCIe) physical (PHY) circuit, a universal serial bus (USB) PHY circuit, or a universal flash storage (UFS) PHY circuit. The clock switching control circuit 202 comprises a power control logic 204, which is configured to control the electronic circuit 200 to switch from the lower-frequency reference clock 102 to the higher-frequency reference clock 104, and vice versa. The power control logic 204 is also referred to herein as a means for controlling a power mode. When the power control logic 204 receives the first power mode signal 120 from an electronic circuit controller 206 to switch the electronic circuit 200 from the low-power operation mode (first operation mode) to the normal-power operation mode (second operation mode), the power control logic 204 generates a clock stability detection request 208 to enable an oscillation detection logic 210 to detect the stability of the higher-frequency reference clock 104. The oscillation detection logic 210 may also be referred to as a means for detecting a clock stability. In a non-limiting example, if the electronic circuit 200 comprises a serializer/deserializer (SerDes) (not shown), which is often provided to perform data serialization in high-speed PHY circuits (e.g., PCIe, USB, and UFS), the oscillation detection logic 210 may be enabled as soon as a SerDes reset is completed. As is further discussed in detail in FIG. 5, the oscillation detection logic 210 is configured to determine the stability of the higher-frequency reference clock 104 based on the lower-frequency reference clock 102. The oscillation detection logic 210 is also configured to provide a clock stability indication 212 to the power control logic 204 if the higher-frequency reference clock 104 is determined stable.

With continuing reference to FIG. 2A, in response to receiving the clock stability indication 212, the power control logic 204 provides an enable PLL indication 214 to a clock generation circuit 215, which comprises a PLL control logic 216 and the PLL 108. The PLL control logic 216 receives the enable PLL indication 214 and, in turn, switches the PLL 108 from the lower-frequency reference clock 102 to the higher-frequency reference clock 104 and provides the enable PLL indication 214 to the PLL 108. In a non-limiting example, the enable PLL indication 214 may be modified by the PLL control logic 216 before being sent to the PLL 108. As previously discussed, the PLL 108 will not function properly until the PLL 108 is phase-locked with the higher-frequency reference clock 104. Once the PLL 108 is in phase-lock with the higher-frequency reference clock 104, the PLL 108 provides a PLL locked indication 218 to the PLL control logic 216. The PLL control logic 216 in turn provides the PLL locked indication 218 to the power control logic 204, indicating that the electronic circuit 200 is ready for the normal-power operation mode. In a non-limiting example, the PLL control logic 216 may modify the PLL locked indication 218 prior to sending the PLL locked indication 218 to the power control logic 204. The PLL control logic 216 also comprises a glitch-free multiplexer (MUX) 219 configured to be controlled to toggle between the lower-frequency reference clock 102 and the higher-frequency reference clock 104 without distorting the lower-frequency reference clock 102 and the higher-frequency reference clock 104.

With continuing reference to FIG. 2A, the power control logic 204 may employ the oscillation detection timeout timer 124 to further improve robustness of the clock switching control circuit 202. In this regard, the power control logic 204 may start the oscillation detection timeout timer 124 as soon as the power control logic 204 generates the clock stability detection request 208 to enable the oscillation detection logic 210. The power control logic 204 is configured to provide the enable PLL indication 214 to switch the electronic circuit 200 from the lower-frequency reference clock 102 to the higher-frequency reference clock 104 if the oscillation detection logic 210 does not provide the clock stability indication 212 when the oscillation detection timeout timer 124 expires.

With continuing reference to FIG. 2A, the power control logic 204 is also configured to switch the electronic circuit 200 from the higher-frequency reference clock 104 to the lower-frequency reference clock 102 when the electronic circuit 200 is switched to the low-power operation mode. In this regard, the power control logic 204 receives the second power mode signal 120' from the electronic circuit controller 206. The second power mode signal 120' instructs the power control logic 204 to switch from the higher-frequency reference clock 104 to the lower-frequency reference clock 102. In a non-limiting example, the first power mode signal 120 is provided by asserting a logical high or a logical low on the power mode signal line 122 and the second power mode signal 120' is provided by asserting a logical low or a logical high on the power mode signal line 122. In another non-limiting example, the first power mode signal 120 and the second power mode signal 120' are control signals specific to the electronic circuit 200. For example, if the electronic circuit 200 is a PCIe circuit, the first power mode signal 120 and the second power mode signal 120' may be provided by asserting and de-asserting a PCIe PclkReq_n signal, respectively. The first power mode signal 120 and the second power mode signal 120' are also received by the reference clock source 116, thereby the reference clock source 116 can enable and disable the higher-frequency reference clock 104, respectively.

With continuing reference to FIG. 2A, in response to receiving the second power mode signal 120', the power control logic 204 asserts a standard output status signal 220 to prevent the reference clock source 116 from shutting down the higher-frequency reference clock 104. Subsequently, the power control logic 204 provides a disable PLL indication 222 to the PLL control logic 216, which in turn provides the disable PLL indication 222 to the PLL 108 to switch the PLL 108 from the higher-frequency reference clock 104 to the lower-frequency reference clock 102. In a non-limiting example, the disable PLL indication 222 may be modified by the PLL control logic 216 before being sent to the PLL 108. The PLL 108 provides a clock switching complete indication 224 to the PLL control logic 216 after switching to the lower-frequency reference clock 102. The PLL control logic 216 then provides the clock switching complete indication 224 to the power control logic 204 to indicate that the electronic circuit 200 is ready to enter the low-power operation mode. In a non-limiting example, the PLL control logic 216 may modify the clock switching complete indication 224 prior to sending the clock switching complete indication 224 to the power control logic 204. At this point, the power control logic 204 de-asserts the standard output status signal 220 to allow the higher-frequency reference clock 104 to be shut down.

With continuing reference to FIG. 2A, the electronic circuit 200 can also be switched from the lower-frequency reference clock 102 to the higher-frequency reference clock 104 in response to a clock switching request 226 originating from outside the IC chip 203. In a non-limiting example, the clock switching request 226 may be generated by the reference clock source 116 or a master chip 228. In this regard, the electronic circuit controller 206 receives the clock switching request 226 and controls the electronic circuit 200 to switch from the lower-frequency reference clock 102 to the higher-frequency reference clock 104 as discussed above.

Figure 2C:
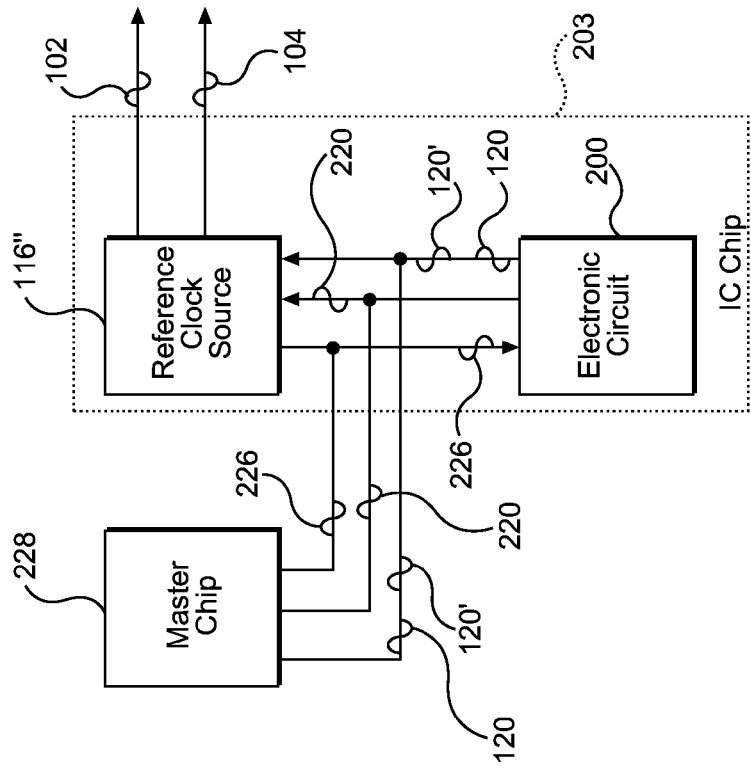
FIG. 2C is a simplified schematic diagram of the electronic circuit of FIG. 2A with the higher-frequency reference clock integrated into an integrated circuit (IC) chip that includes the electronic circuit of FIG. 2A.
Figure 2B:
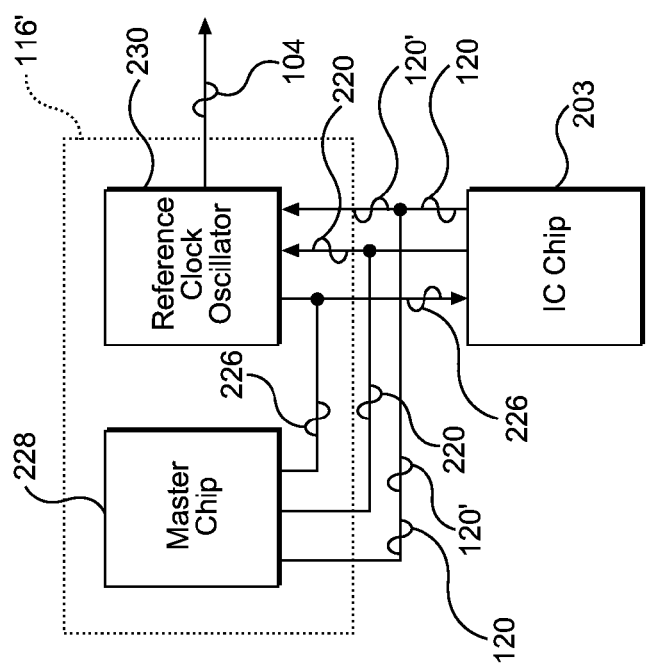
FIG. 2B is a simplified schematic diagram of the electronic circuit of FIG. 2A with the higher-frequency reference clock controlled by a separate master chip.

As illustrated in FIG. 2A, the reference clock source 116 is separated from the master chip 228 and the IC chip 203. However, the reference clock source 116 may also be integrated with the master chip 228 or embedded in the IC chip 203. In this regard, FIG. 2B is a schematic diagram of an exemplary reference clock source 116' integrated with the master chip 228 outside the IC chip 203 that comprises the electronic circuit 200 of FIG. 2A. Likewise, FIG. 2C is a schematic diagram of an exemplary reference clock source 116" embedded in the IC chip 203 that comprises the electronic circuit 200 of FIG. 2A. Common elements between FIGS. 2A, 2B, and 2C are shown therein with common element numbers and will not be re-described herein.

With reference to FIG. 2B, the reference clock source 116' comprises a reference clock oscillator 230 configured to generate the higher-frequency reference clock 104. The IC chip 203 and the master chip 228 share the first power mode signal 120, the second power mode signal 120', the standard output status signal 220, and the clock switching request 226. In a non-limiting example, the first power mode signal 120, the second power mode signal 120', the standard output status signal 220, and the clock switching request 226 may be combined into a single common signal (e.g., CLKREQ# if the IC chip 203 is a PCIe circuit).

With reference to FIG. 2C, the reference clock source 116" is embedded in the IC chip 203. In a non-limiting example, the reference clock source 116" may be integrated with the clock controller 114 (not shown) to provide both the lower-frequency reference clock 102 and the higher-frequency reference clock 104.

Figure 3:
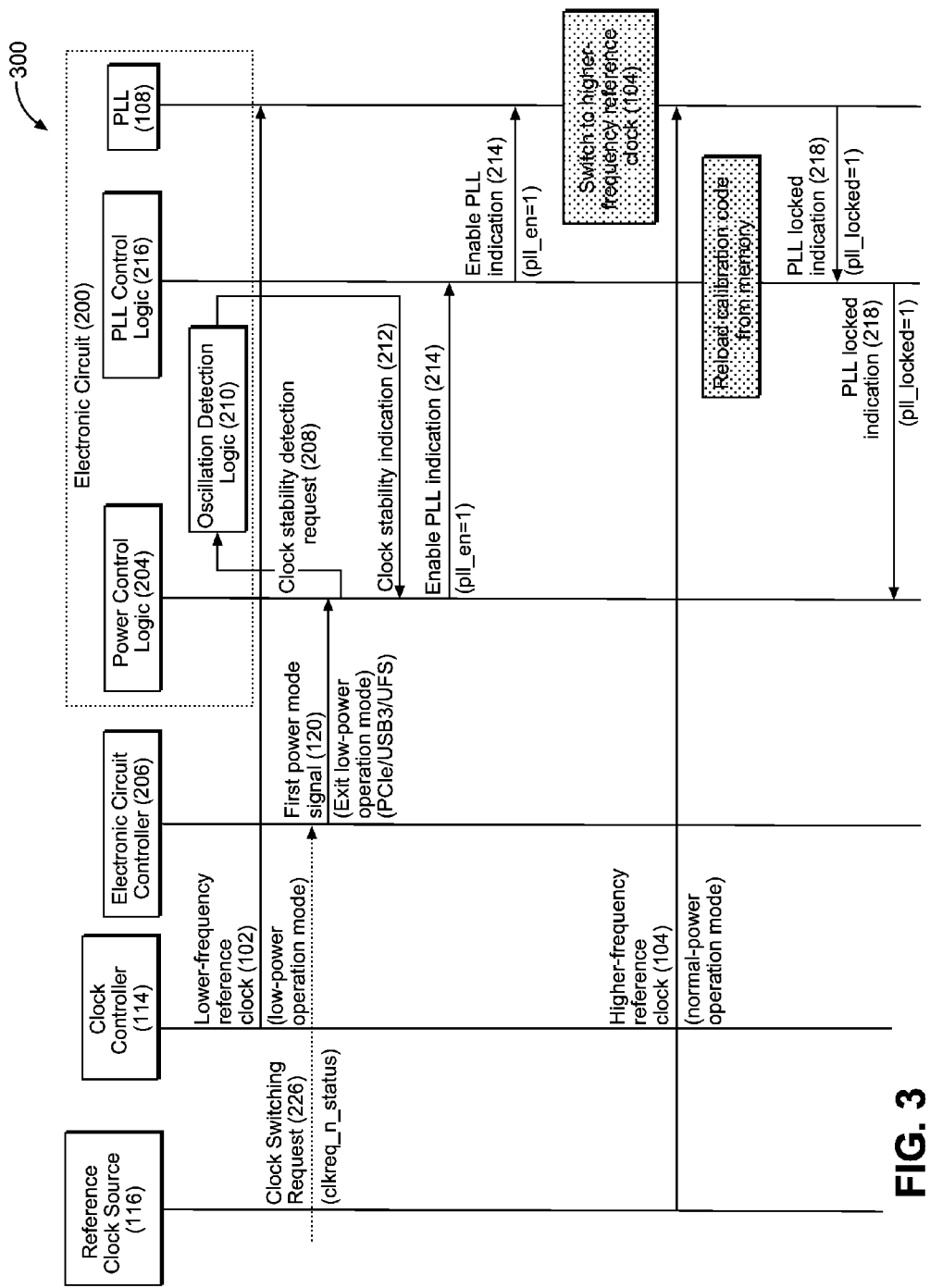
FIG. 3 illustrates an exemplary clock switching signaling flow for switching the electronic circuit of FIG. 2A from the lower-frequency reference clock to the higher-frequency reference clock.
Figure 4:
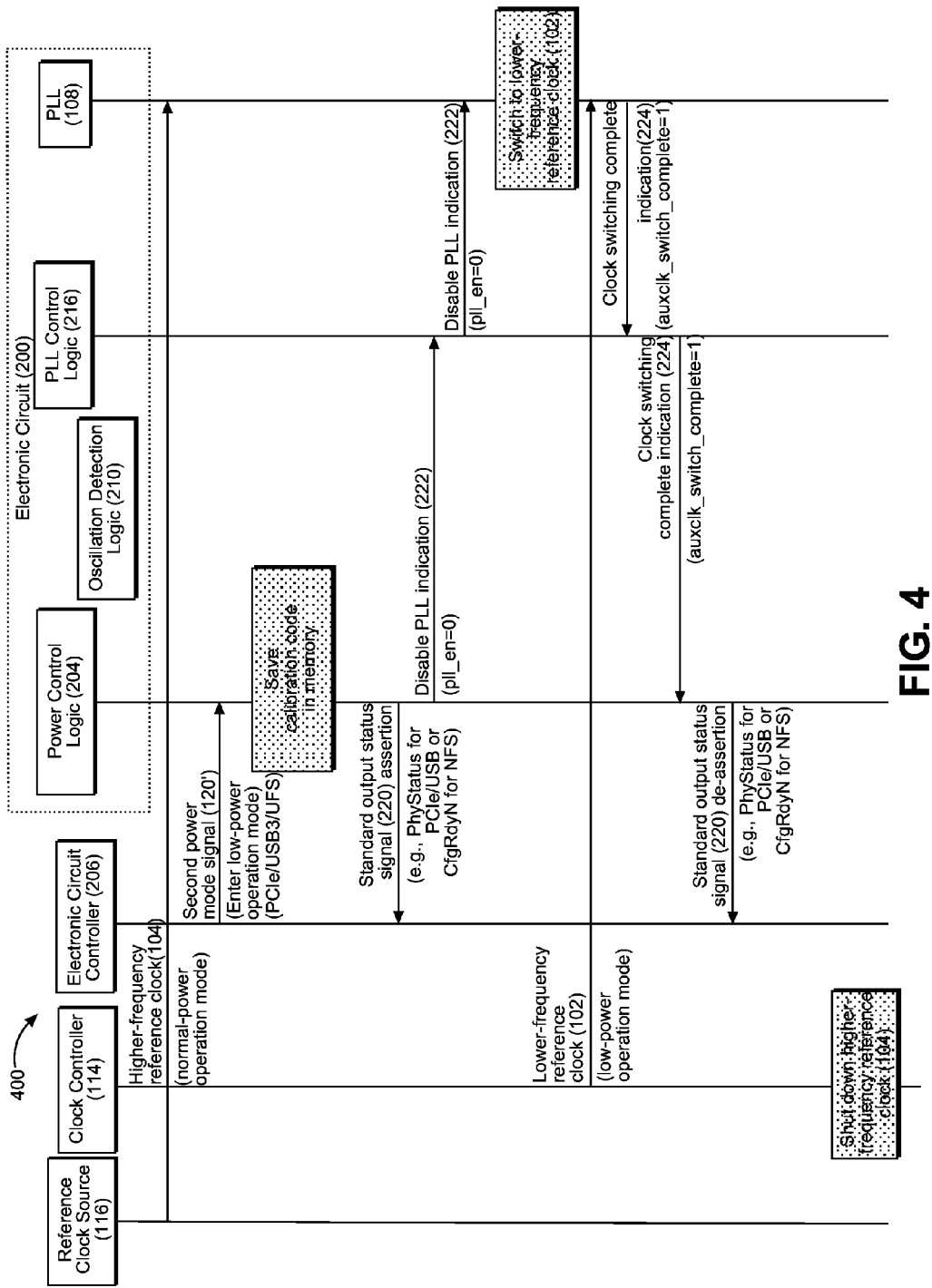
FIG. 4 illustrates an exemplary clock switching signaling flow for switching the electronic circuit of FIG. 2A from the higher-frequency reference clock to the lower-frequency reference clock.

To further illustrate various control signals for enabling the clock switching aspects discussed in FIG. 2A, FIGS. 3 and 4 are provided. In this regard, FIG. 3 illustrates an exemplary clock switching signaling flow 300 for switching the electronic circuit 200 of FIG. 2A from the lower-frequency reference clock 102 to the higher-frequency reference clock 104. Elements of FIGS. 1 and 2A are referenced in connection with FIG. 3 and will not be re-described herein.

With continuing reference to FIG. 3, the electronic circuit 200 operates on the lower-frequency reference clock 102 while in the low-power operation mode. To switch the electronic circuit 200 from the low-power operation mode to the normal-power operation mode, the electronic circuit controller 206 provides the first power mode signal 120 to the power control logic 204. In a non-limiting example, the electronic circuit controller 206 may generate the first power mode signal 120 in response to receiving the clock switching request 226. The power control logic 204 provides the clock stability detection request 208 to enable the oscillation detection logic 210 to detect the stability of the higher-frequency reference clock 104. Upon receiving the clock stability indication 212 that indicates that the higher-frequency reference clock 104 is stable, the power control logic 204 provides the enable PLL indication 214 to the PLL control logic 216 to switch the electronic circuit 200 to the higher-frequency reference clock 104. In a non-limiting example, the enable PLL indication 214 comprises a pll_en indicator that is set to one (1) (pll_en=1). The PLL control logic 216 in turn provides the enable PLL indication 214 to the PLL 108. In a non-limiting example, the PLL control logic 216 may reload calibration codes from memory before enabling the PLL 108 to phase lock with the higher-frequency reference clock 104. Once the PLL 108 is phase locked with the higher-frequency reference clock 104, the PLL 108 provides the PLL locked indication 218 to the PLL control logic 216. In a non-limiting example, the PLL locked indication 218 comprises a pll_locked indicator that is set to 1 (pll_locked=1).

FIG. 4 illustrates an exemplary clock switching signaling flow 400 for switching the electronic circuit 200 of FIG. 2A from the higher-frequency reference clock 104 to the lower-frequency reference clock 102. Elements of FIGS. 1 and 2A are referenced in connection with FIG. 4 and will not be re-described herein.

With continuing reference to FIG. 4, the electronic circuit 200 operates under the higher-frequency reference clock 104 while in the normal-power operation mode. To switch the electronic circuit 200 from the normal-power operation mode to the low-power operation mode, the electronic circuit controller 206 provides the second power mode signal 120' to the power control logic 204. Upon receiving the second power mode signal 120', the power control logic 204 saves the calibration codes in memory. The power control logic 204 also asserts the standard output status signal 220 to prevent the reference clock source 116 from shutting down the higher-frequency reference clock 104. In a non-limiting example, the standard output status signal 220 may contain a PCIe PclkAck_n indication, a USB PhyStatus indication, or a UFS CfgRdyN indication. Subsequently, the power control logic 204 provides the disable PLL indication 222 to the PLL control logic 216. In a non-limiting example, the disable PLL indication 222 comprises the pll_en indicator that is set to zero (0) (pll_en=0). The PLL control logic 216 in turn provides the disable PLL indication 222 to the PLL 108 to disable the PLL 108 and keep the electronic circuit 200 running on the lower-frequency reference clock 102.

With continuing reference to FIG. 4, the PLL 108 provides the clock switching complete indication 224 to the PLL control logic 216 when the PLL 108 is disabled. The PLL control logic 216 then provides the clock switching complete indication 224 to the power control logic 204, indicating that the electronic circuit 200 has switched to the low-power operation mode. In a non-limiting example, the clock switching complete indication 224 comprises an aux-clk_switch_complete indicator that is set to 1. At this point, the power control logic 204 de-asserts the standard output status signal 220 to the reference clock source 116 to allow the higher-frequency reference clock 104 to be shut down. The clock controller 114 may then shut down the higher-frequency reference clock 104 if the master chip 228 (not shown) is not using the higher-frequency reference clock 104.

Figure 5:
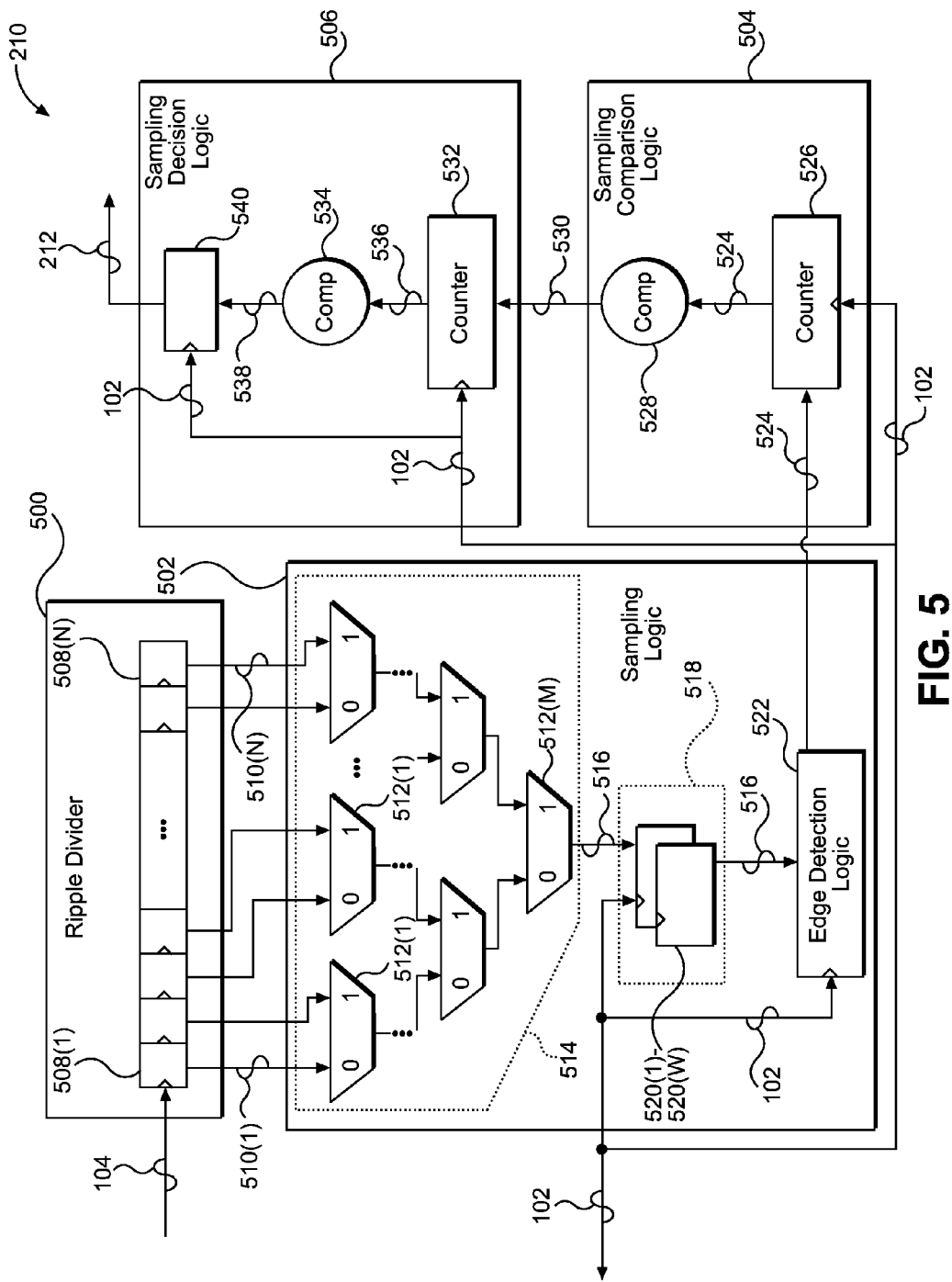
FIG. 5 is an exemplary illustration of an oscillation detection logic configured to provide a clock stability indication that is used by the electronic circuit of FIG. 2A to switch from the lower-frequency reference clock to the higher-frequency reference clock.

As previously discussed in reference to FIG. 2A, the oscillation detection logic 210 is configured to determine the stability of the higher-frequency reference clock 104 based on the lower-frequency reference clock 102, thus ensuring a glitch-free switching from the lower-frequency reference clock 102 to the higher-frequency reference clock 104. In this regard, FIG. 5 is an exemplary illustration of the oscillation detection logic 210 of FIG. 2A configured to provide the clock stability indication 212 that is used by the electronic circuit 200 to switch from the lower-frequency reference clock 102 to the higher-frequency reference clock 104. Common elements between FIGS. 1, 2A, and 5 are shown therein with common element numbers and will not be re-described herein.

With continuing reference to FIG. 5, the oscillation detection logic 210 comprises a ripple divider 500, a sampling logic 502, a sampling comparison logic 504, and a sampling decision logic 506. The ripple divider 500 comprises a plurality of ripple counters 508(1)-508(N), wherein N is a finite positive integer. Each of the plurality of ripple counters 508(1)-508(N) receives a clock input signal (not shown) and generates an output signal (not shown). Furthermore, each of the plurality of ripple counters 508(1)-508(N) is a divide-by-two counter configured to generate the output signal that is one-half ($\frac{1}{2}$) of the clock input signal. For example, if the clock input signal to the ripple counter 508(1) is one hundred (100) megahertz (MHz), the output signal of the ripple counter 508(1) will be fifty (50) MHz. The plurality of ripple counters 508(1)-508(N) is disposed according to a serial arrangement, wherein each of the plurality of ripple counters 508(1)-508(N) generates a respective output signal that acts as both the output signal of the ripple counter itself and the clock input signal to the succeeding ripple counter in the serial arrangement. For example, the output signal of the ripple counter 508(1) acts as both the output signal of the ripple counter 508(1) and the clock input signal to the ripple counter 508(2), the output signal of the ripple counter 508(2) acts as both the output signal of the ripple counter 508(2) and the clock input signal to the ripple counter 508(3), and so on. The ripple counter 508(1), which is the first ripple counter in the ripple divider 500, receives the higher-frequency reference clock 104 as the clock input signal. In this regard, the plurality of ripple counters 508(1)-508(N) produces a plurality of divided clock signals 510(1)-510(N), wherein the divided clock signal 510(X) ($1 \leq X \leq N$) has a respective frequency equal to two-to-the-negative-Xth-power ($2^{-X}$) of the higher-frequency reference clock 104. For example, the divided clock signal 510(1) has the respective frequency equal to $\frac{1}{2}$ ($2^{-1}$) of the higher-frequency reference clock 104, the divided clock signal 510(2) has the respective frequency equal to one-fourth ($\frac{1}{4}$) ($2^{-2}$) of the higher-frequency reference clock 104, and so on. In this regard, each of the plurality of divided clock signals 510(1)-510(N) has a slower respective frequency than the higher-frequency reference clock 104. In a non-limiting example, each of the plurality of ripple counters 508(1)-508(N) is provided as a decrementing counter to ensure the plurality of divided clock signals 510(1)-510(N) are aligned on respective rising edges, thus reducing latency on initial rising edge detection.

With continuing reference to FIG. 5, the sampling logic 502 comprises a plurality of low-distortion MUXs 512(1)-512(M) disposed according to a binary tree structure 514. The plurality of low-distortion MUXs 512(1)-512(M) is configured to select programmably a sampled clock signal 516 among the plurality of divided clock signals 510(1)-510(N). In a non-limiting example, the sampled clock signal 516 is at least four (4) times slower than the lower-frequency reference clock 102. In this regard, the number of ripple counters 508(1)-508(N) comprised in the ripple divider 500 is determined by the frequencies of the lower-frequency reference clock 102 and the higher-frequency reference clock 104. In a non-limiting example, if the frequencies of the lower-frequency reference clock 102 and the higher-frequency reference clock 104 are 10 MHz and 1 gigahertz (GHz), respectively, and the sampled clock signal 516 needs to be 4 times slower than the lower-frequency reference clock 102, the ripple divider 500 must comprise a minimum of nine (9) ripple counters 508(1)-508(9).

With continuing reference to FIG. 5, the sampling logic 502 also comprises a synchronization element 518 configured to stop metastability and glitches in the sampled clock signal 516 from propagating outside the sampling logic 502. In a non-limiting example, the synchronization element 518 comprises one or more flip-flop counters 520(1)-520(W). The sampling logic 502 also comprises an edge detection logic 522 configured to detect rising edges of the sampled clock signal 516 in accordance to the lower-frequency reference clock 102 and output one or more edge detect indications 524, which is relative to a clock cycle of the lower-frequency reference clock 102, to the sampling comparison logic 504.

With continuing reference to FIG. 5, the sampling comparison logic 504 comprises a clock edge counter 526 configured to count the one or more edge detect indications 524 received from the edge detection logic 522 during the clock cycle of the lower-frequency reference clock 102. The sampling comparison logic 504 also comprises a frequency comparator 528. For each of the one or more edge detect indications 524 received in the clock cycle of the lower-frequency reference clock 102, the frequency comparator 528 is configured to determine a frequency differential between the clock cycle and the lower-frequency reference clock 102 (benchmark clock signal). The frequency comparator 528 then compares the frequency differential against a predetermined frequency match threshold. If the frequency differential is less than the predetermined frequency match threshold, the frequency comparator 528 provides a frequency match indication 530 to the sampling decision logic 506 to indicate that a frequency match is detected. Because the frequency of the lower-frequency reference clock 102 is known, the frequency differential can help detect the frequency of the sampled clock signal 516 and, therefore, the frequency of the higher-frequency reference clock 104. Furthermore, since the frequency of the sampled clock signal 516 is slower than the lower-frequency reference clock 102, the frequency differential can be determined more precisely. Hence, by comparing each of the one or more edge detect indications 524 against the lower-frequency reference clock 102, the frequency comparator 528 may provide one or more of the frequency match indications 530 to the sampling decision logic 506.

With continuing reference to FIG. 5, the sampling decision logic 506 comprises a frequency match counter 532 configured to provide a count of the one or more frequency match indications 530 received from the sampling comparison logic 504. In a non-limiting example, for each of the one or more edge detect indications 524 received during the clock cycle of the lower-frequency reference clock 102, the frequency match counter 532 is increased by 1 if the frequency match indication 530 is received during the clock cycle. In contrast, the frequency match counter 532 is reset to 0 if the frequency match indication 530 is not received during the clock cycle of the lower-frequency reference clock 102. As such, the frequency match counter 532 always reflects the frequency match indication 530 received consecutively from the frequency comparator 528. A threshold comparator 534 retrieves a counter reading 536 from the frequency match counter 532 and compares the counter reading 536 with a predetermined clock stability threshold. If the counter reading 536 is greater than or equal to the predetermined clock stability threshold, the higher-frequency reference clock 104 is determined stable. The threshold comparator 534 can thus generate a clock stability notification 538. The sampling decision logic 506 also comprises a decision output logic 540 configured to generate the clock stability indication 212, which indicates the higher-frequency reference clock 104 is stable, in response to receiving the clock stability notification 538.

Figure 6:
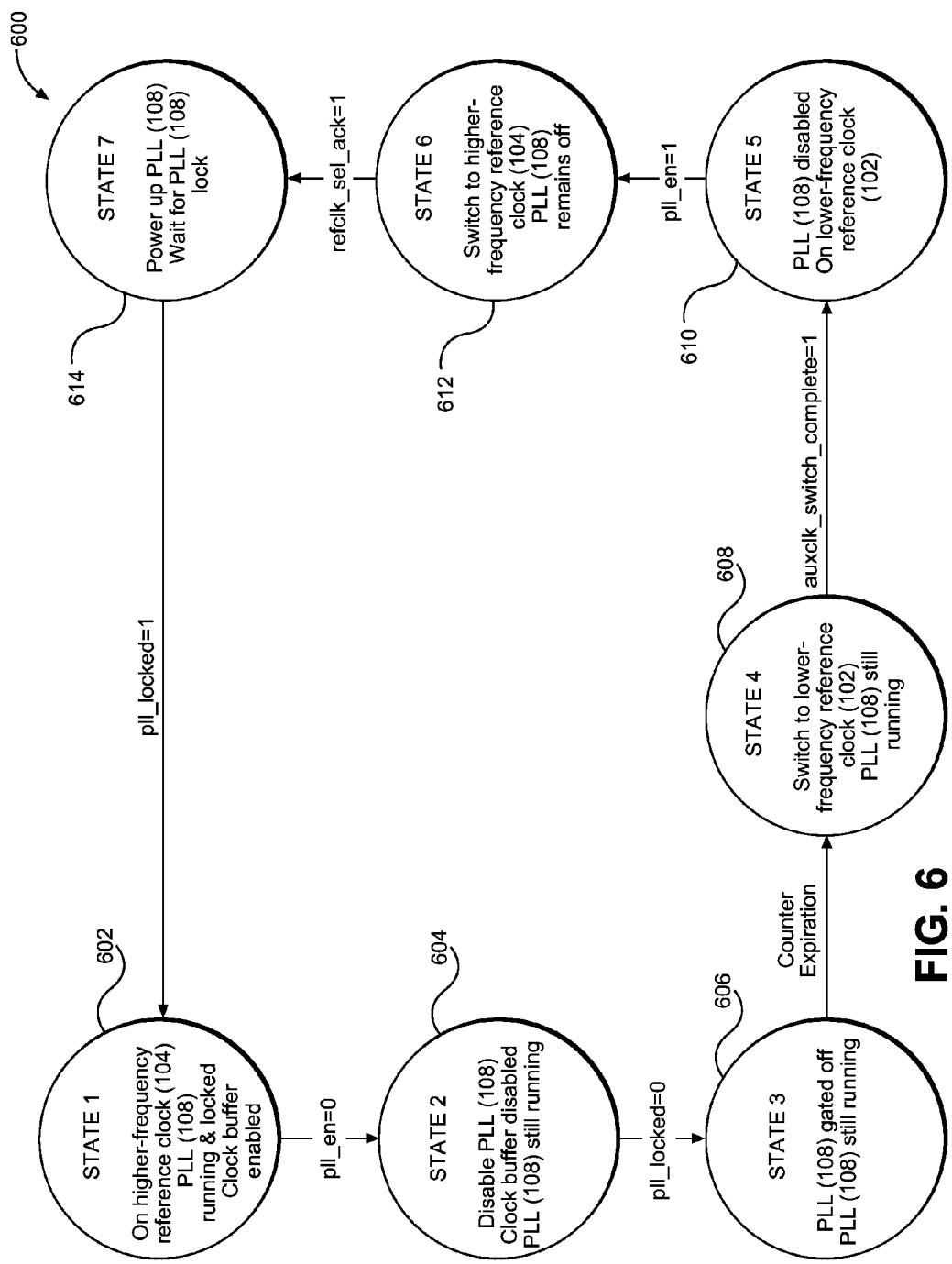
FIG. 6 is an exemplary state machine diagram illustrating state changes in a clock generation circuit when the electronic circuit of FIG. 2A switches between the higher-frequency reference clock and the lower-frequency reference clock.

As previously discussed in FIG. 2A, the clock stability indication 212 generated by the oscillation detection logic 210 causes the power control logic 204 to enable the PLL control logic 216, and thus, the PLL 108. To further illustrate the control mechanism between the PLL control logic 216 and the PLL 108, FIG. 6 is provided. In this regard, FIG. 6 is an exemplary state machine diagram 600 illustrating state changes in the clock generation circuit 215 of FIG. 2A when the electronic circuit 200 switches between the higher-frequency reference clock 104 and the lower-frequency reference clock 102. Elements of FIGS. 2A, 3, and 4 are referenced in connection to FIG. 6 and will not be re-described herein.

With continuing reference to FIG. 6, in state 1 (block 602), the electronic circuit 200 is operating in the normal-power operation mode based on the higher-frequency reference clock 104. The PLL 108 is running and phase-locked with the higher-frequency reference clock 104. The PLL 108 may comprise a clock buffer (not shown) and the clock buffer is enabled. The clock generation circuit 215 transitions from state 1 to state 2 (block 604) when the PLL control logic 216 receives the disable PLL indication 222, wherein the pll_en indication is set to 0 (pll_en=0). In state 2, the PLL 108 and the clock buffer are disabled, but the PLL 108 remains running. The clock generation circuit 215 transitions to state 3 (block 606) when the PLL 108 is no longer in phase-lock with the higher-frequency reference clock 104. At this point, the PLL 108 is still running, but is gated off. In a non-limiting example, a gate-off counter (e.g., 20M counter) may be started to ensure that the clock generation circuit 215 remains in state 3 while the PLL 108 is disabled. The clock generation circuit 215 transitions into state 4 (block 608) when the gate-off counter expires. In state 4, the clock generation circuit 215 and the electronic circuit 200 are switching from the higher-frequency reference clock 104 to the lower-frequency reference clock 102. The clock generation circuit 215 exits state 4 and enters state 5 (block 610) when the PLL 108 generates the clock switching complete indication 224, wherein the auxclk_switch_complete indicator is set to 1 (auxclk_switch_complete=1). In state 5, the PLL 108 is disabled. The electronic circuit 200 is operating in the low-power operation mode based on the lower-frequency reference clock 102. At this point, the switching from the higher-frequency reference clock 104 to the lower-frequency reference clock 102 is complete.

With continuing reference to FIG. 6, the clock generation circuit 215 transitions to state 6 (block 612) when the PLL control logic 216 receives the enable PLL indication 214, wherein the pll_en indicator is set to 1 (pll_en=1). When the pll_en indicator is set to 1, the electronic circuit 200 is going to exit the low-power operation mode and switch to the normal-power operation mode. At state 6, the clock generation circuit 215 is switching from the lower-frequency reference clock 102 to the higher-frequency reference clock 104 while the PLL 108 remains off. The clock generation circuit 215 transitions to state 7 (block 614) when the clock generation circuit 215 has switched from the lower-frequency reference clock 102 to the higher-frequency reference clock 104. In this case, the PLL 108 may provide a refclk_sel_ack indicator, which is set to 1 (refclk_sel_ack=1), to the PLL control logic 216. In state 7, the PLL 108 is powered up and attempts to phase-lock with the higher-frequency reference clock 104. The clock generation circuit 215 and the electronic circuit 200 transition to the state 1 when the PLL 108 is phase-locked with the higher-frequency reference clock 104. As a result, the electronic circuit 200 returns to the normal-power operation mode based on the higher-frequency reference clock 104.

The apparatuses, methods, and systems for glitch-free clock switching according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 7:
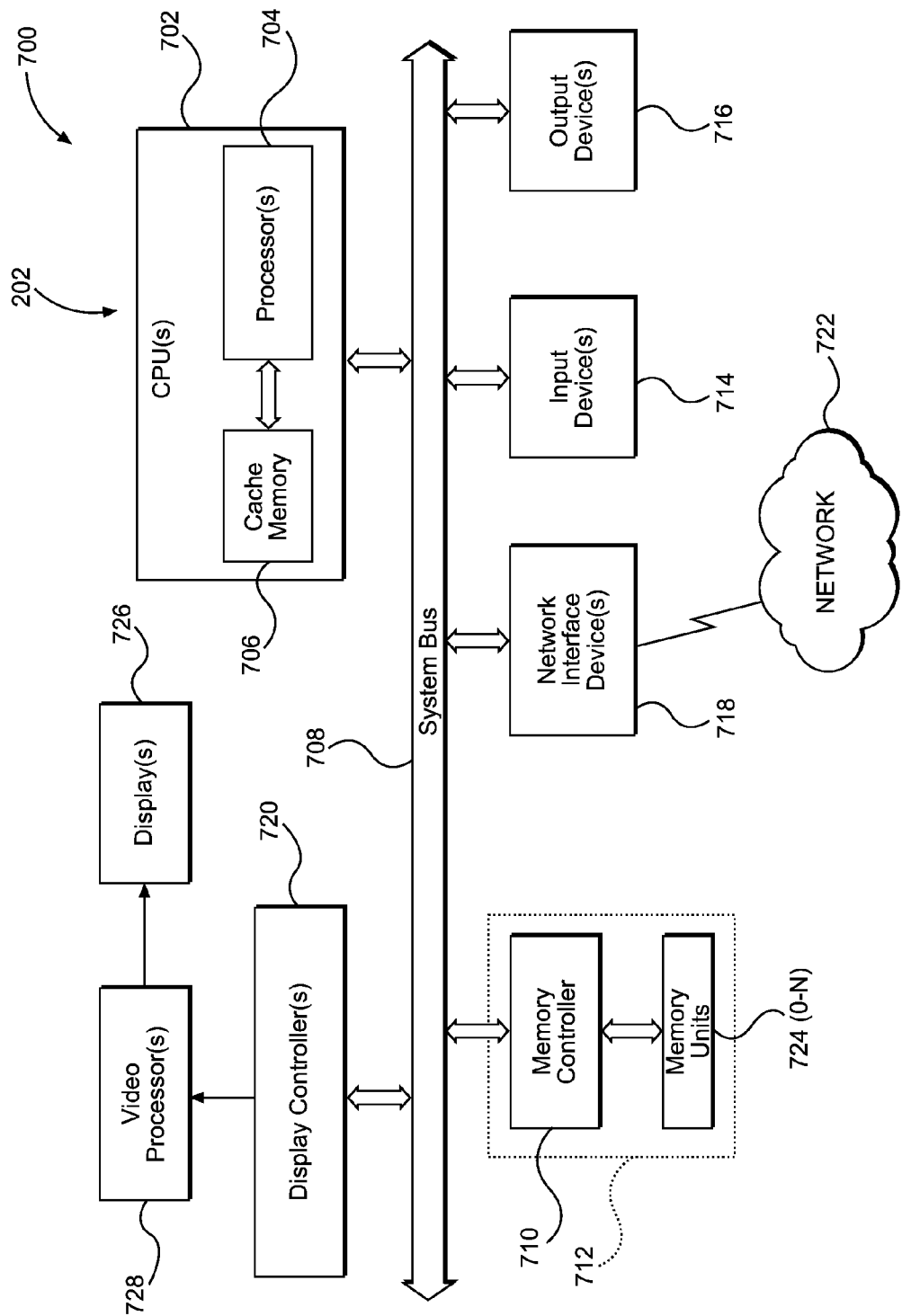
FIG. 7 illustrates an example of a processor-based system that can employ a clock switching control circuit.

In this regard, FIG. 7 illustrates an example of a processor-based system 700 that can employ the clock switching control circuit 202 illustrated in FIG. 2A. In this example, the processor-based system 700 includes one or more central processing units (CPUs) 702, each including one or more processors 704. The CPU(s) 702 may have cache memory 706 coupled to the processor(s) 704 for rapid access to temporarily stored data. The CPU(s) 702 may be configured to provide the clock switching control circuit 202. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory controller 710 as an example of a slave device. Although not illustrated in FIG. 7, multiple system buses 708 could be provided, wherein each system bus 708 constitutes a different fabric.

Other master and slave devices can be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any device configured to allow exchange of data to and from a network 722. The network 722 can be any type of network, including, but not limited to, a wired or wireless network, a private or public network, a local area network (LAN), a wireless local area network (WLAN), a Bluetooth™ network, a wide area network (WAN), a BLUETOOTH™ network, or the Internet. The network interface device(s) 718 can be configured to support any type of communications protocol desired. The memory system 712 can include one or more memory units 724(0-N).

The CPU(s) 702 may also be configured to access the display controller(s) 720 over the system bus 708 to control information sent to one or more displays 726. The display controller(s) 720 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A clock switching control circuit, comprising:
   a power control logic configured to switch an electronic circuit from a first reference clock signal associated with a first operation mode to a second reference clock signal associated with a second operation mode; and
   an oscillation detection logic coupled to the power control logic, wherein the oscillation detection logic is configured to:
      derive a plurality of divided clock signals from the second reference clock signal, wherein each of the plurality of divided clock signals has a slower respective frequency than the second reference clock signal;
      programmably select a sampled clock signal among the plurality of divided clock signals based on the first reference clock signal;
      provide one or more edge detect indications of the sampled clock signal;
      generate a frequency match indication for each of the one or more edge detect indications having a respective frequency differential between the edge detect indication and the first reference clock signal less than a predetermined frequency match threshold;
      determine that the second reference clock signal is stable if a count of consecutive frequency match indications is greater than or equal to a predetermined clock stability threshold; and
      provide a clock stability indication to the power control logic if the second reference clock signal is determined stable;
   wherein the power control logic is configured to control the electronic circuit to switch from the first reference clock signal to the second reference clock signal in response to receiving the clock stability indication.

2. The clock switching control circuit of claim 1, wherein the first operation mode is a low-power operation mode associated with the first reference clock signal and the second operation mode is a normal-power operation mode associated with the second reference clock signal.

3. The clock switching control circuit of claim 1, wherein:
   the first reference clock signal is a lower-frequency reference clock; and
   the second reference clock signal is a higher-frequency reference clock having a higher frequency than the lower-frequency reference clock.

4. The clock switching control circuit of claim 1, wherein the power control logic is provided in a physical coding sublayer (PCS) in the electronic circuit.

5. The clock switching control circuit of claim 1, wherein the oscillation detection logic comprises:
   a ripple divider comprising a plurality of ripple counters disposed according to a serial arrangement, wherein the ripple divider is configured to derive the plurality of divided clock signals from the second reference clock signal; and
   a sampling logic coupled to the ripple divider to receive the plurality of divided clock signals, wherein the sampling logic is configured to:
      programmably select the sampled clock signal among the plurality of divided clock signals based on the first reference clock signal; and
      provide the one or more edge detect indications of the sampled clock signal to a sampling comparison logic;
   wherein the sampling comparison logic is configured to:
      for each of the one or more edge detect indications of the sampled clock signal:
         determine a frequency differential between the edge detect indication and the first reference clock signal;
         compare the frequency differential against the predetermined frequency match threshold; and
         generate and provide the frequency match indication to a sampling decision logic if the frequency differential is less than the predetermined frequency match threshold;
   wherein the sampling decision logic is configured to provide the clock stability indication to the power control logic if the count of consecutive frequency match indications is greater than or equal to the predetermined clock stability threshold.

6. The clock switching control circuit of claim 5, wherein the sampled clock signal is at least four (4) times slower than the first reference clock signal.

7. The clock switching control circuit of claim 5, wherein each of the plurality of ripple counters is a decrementing counter.

8. The clock switching control circuit of claim 1, wherein the power control logic enables the oscillation detection logic by providing a clock stability detection request to the oscillation detection logic.

9. The clock switching control circuit of claim 8, wherein the power control logic is further configured to:
   start an oscillation detection timeout timer when providing the clock stability detection request to the oscillation detection logic; and
   switch the electronic circuit from the first reference clock signal to the second reference clock signal if the clock stability indication is not received at expiration of the oscillation detection timeout timer.

10. The clock switching control circuit of claim 1, wherein the power control logic is further configured to switch the electronic circuit from the second reference clock signal associated with the second operation mode to the first reference clock signal associated with the first operation mode.

11. A clock switching control circuit, comprising:
    a means for controlling a power mode configured to switch an electronic circuit from a first reference clock signal associated with a first operation mode to a second reference clock signal associated with a second operation mode; and a means for detecting a clock stability coupled to the means for controlling the power mode, wherein the means for detecting the clock stability is configured to:
  derive a plurality of divided clock signals from the second reference clock signal, wherein each of the plurality of divided clock signals has a slower respective frequency than the second reference clock signal;
  programmably select a sampled clock signal among the plurality of divided clock signals based on the first reference clock signal;
  provide one or more edge detect indications of the sampled clock signal;
  generate a frequency match indication for each of the one or more edge detect indications having a respective frequency differential between the edge detect indication and the first reference clock signal less than a predetermined frequency match threshold;
  determine that the second reference clock signal is stable if a count of consecutive frequency match indications is greater than or equal to a predetermined clock stability threshold; and
  provide a clock stability indication to the means for controlling the power mode if the second reference clock signal is determined stable;
wherein the means for controlling the power mode is configured to control the electronic circuit to switch from the first reference clock signal to the second reference clock signal in response to receiving the clock stability indication.

12. A method for switching from a lower-frequency reference clock to a higher-frequency reference clock in an electronic circuit, comprising:
  deriving a plurality of divided clock signals from the higher-frequency reference clock, wherein each of the plurality of divided clock signals has a slower respective frequency than the higher-frequency reference clock;
  programmably selecting a sampled clock signal among the plurality of divided clock signals based on the lower-frequency reference clock;
  providing one or more edge detect indications of the sampled clock signal;
  generating a frequency match indication for each of the one or more edge detect indications having a respective frequency differential between the edge detect indication and the lower-frequency reference clock less than a predetermined frequency match threshold;
  determining that the higher-frequency reference clock is stable if a count of consecutive frequency match indications is greater than or equal to a predetermined clock stability threshold; and
  switching from the lower-frequency reference clock to the higher-frequency reference clock if the higher-frequency reference clock is determined stable.

13. The method of claim 12, further comprising switching from a low-power operation mode associated with the lower-frequency reference clock to a normal-power operation mode associated with the higher-frequency reference clock.

14. The method of claim 12, further comprising:
  providing a clock stability detection request from a power control logic to enable an oscillation detection logic;
  receiving a clock stability indication from the oscillation detection logic if the higher-frequency reference clock is determined stable;
  providing an enable phase-locked loop (PLL) indication to a PLL control logic to control the PLL control logic to switch from the lower-frequency reference clock to the higher-frequency reference clock, wherein the enable PLL indication comprises a pll_en indicator that is set to one (1); and
  receiving a PLL locked indication from the PLL control logic when a PLL is phase locked with the higher-frequency reference clock, wherein the PLL locked indication comprises a pll_locked indicator that is set to 1.

15. The method of claim 12, further comprising switching from the higher-frequency reference clock to the lower-frequency reference clock when the electronic circuit is switched to a low-power operation mode.

16. The method of claim 15, further comprising switching from a normal-power operation mode associated with the higher-frequency reference clock to the low-power operation mode associated with the lower-frequency reference clock.

17. The method of claim 15, further comprising:
  asserting a standard output status signal from a power control logic to prevent shutdown of the higher-frequency reference clock prior to switching from the higher-frequency reference clock to the lower-frequency reference clock;
  providing a disable phase-locked loop (PLL) indication to a PLL control logic to control the PLL control logic to switch from the higher-frequency reference clock to the lower-frequency reference clock, wherein the disable PLL indication comprises a pll_en indicator that is set to zero (0);
  receiving a clock switching complete indication from the PLL control logic when the PLL control logic is switched to the lower-frequency reference clock, wherein the clock switching complete indication comprises an auxclk_switch_complete indicator that is set to one (1); and
  de-asserting the standard output status signal from the power control logic to allow shutdown of the higher-frequency reference clock in response to receiving the clock switching complete indication.

18. The method of claim 17, wherein asserting the standard output status signal comprises asserting a peripheral component interconnect express (PCIe) PclkAck_n indication.

19. The method of claim 17, wherein asserting the standard output status signal comprises asserting a universal serial bus (USB) PhyStatus indication.

20. The method of claim 17, wherein asserting the standard output status signal comprises asserting a universal flash storage (UFS) CfgRdyN indication.

21. An oscillation detection logic, comprising:
  a ripple divider configured to generate a plurality of divided clock signals based on a clock input signal;
  a sampling logic coupled to the ripple divider, wherein the sampling logic is configured to:
    select programmably a sampled clock signal among the plurality of divided clock signals; and
    output one or more edge detect indications relative to a clock cycle of a benchmark clock signal;
  a sampling comparison logic coupled to the sampling logic to receive the one or more edge detect indications, wherein the sampling comparison logic is configured to count the one or more edge detect indications received during the clock cycle of the benchmark clock signal to detect a frequency match between the sampled clock signal and the benchmark clock signal; and a sampling decision logic coupled to the sampling comparison logic, wherein the sampling decision logic is configured to:

determine stability of the clock input signal based on a predetermined clock stability threshold; and generate a clock stability indication if the clock input signal is determined stable.

22. The oscillation detection logic of claim 21, wherein:

the clock input signal is a higher-frequency reference clock associated with a normal-power operation mode; and the benchmark clock signal is a lower-frequency reference clock associated with a low-power operation mode.

23. The oscillation detection logic of claim 21, wherein the ripple divider comprises a decrementing counter configured to align the plurality of divided clock signals on respective rising edges.

24. The oscillation detection logic of claim 21, wherein the sampling logic comprises:

a plurality of low-distortion multiplexers (MUXs) disposed according to a binary tree structure, wherein the plurality of low-distortion MUXs is configured to select programmably the sampled clock signal among the plurality of divided clock signals;

a synchronization element configured to block metastability and glitches in the sampled clock signal from propagating outside the sampling logic; and an edge detection logic coupled to the synchronization element, wherein the edge detection logic is configured to output the one or more edge detect indications relative to the clock cycle of the benchmark clock signal.

25. The oscillation detection logic of claim 21, wherein the sampling comparison logic comprises:

a clock edge counter configured to receive and count the one or more edge detect indications in the clock cycle of the benchmark clock signal; and a frequency comparator configured to detect the frequency match between the sampled clock signal and the benchmark clock signal, wherein:

for each of the one or more edge detect indications received in the clock cycle of the benchmark clock signal:

determine a frequency differential between the clock cycle and the benchmark clock signal;

compare the frequency differential against a predetermined frequency match threshold;

generate a frequency match indication if the frequency differential is less than the predetermined frequency match threshold; and provide the frequency match indication to the sampling decision logic.

26. The oscillation detection logic of claim 21, wherein the sampling decision logic comprises:

a frequency match counter coupled to the sampling comparison logic to receive a frequency match indication, wherein the frequency match counter is configured to count the frequency match indication;

a threshold comparator coupled to the frequency match counter, wherein the threshold comparator is configured to:

get a counter reading from the frequency match counter;

compare the counter reading with the predetermined clock stability threshold; and generate a clock stability notification if the counter reading is greater than or equal to the predetermined clock stability threshold; and a decision output logic coupled to the threshold comparator to receive the clock stability notification, wherein the decision output logic is configured to generate the clock stability indication in response to receiving the clock stability notification.

* * * * *